United States Patent [19]

Chaix et al.

[11] 4,358,301

[45] Nov. 9, 1982

[54] APPARATUS FOR SEPARATING THE LIQUID AND VAPOR PHASES OF A FLUID

[75] Inventors: Jean E. Chaix, Manosque; Maurice Fajeau, Pertuis; Jean F. Ouzeau, Saint Sebastien sur Loire, all of France

[73] Assignee: Commissariat a l'Energie Atomique, Paris, France

[21] Appl. No.: 227,540

[22] Filed: Dec. 22, 1980

[30] Foreign Application Priority Data

Jan. 4, 1980 [FR] France ................................ 80 00125

[51] Int. Cl.³ ...................... B01D 50/00; B01D 45/12
[52] U.S. Cl. ...................................... 55/318; 55/343; 55/345; 55/348; 55/391; 55/396; 55/397; 55/456; 122/34; 122/488; 122/491; 122/492
[58] Field of Search ................................ 55/396–397, 55/448–450, 456, 391, 343, 345, 347–348, 318; 122/488, 34, 491, 492

[56] References Cited

U.S. PATENT DOCUMENTS

| 3,304,694 | 2/1967 | Manger et al. | 55/347 X |
|---|---|---|---|
| 3,448,563 | 6/1969 | Sobeck | 55/450 X |
| 3,498,028 | 3/1970 | Trouw | 55/456 X |
| 3,507,099 | 4/1970 | Marshall | 55/456 |
| 3,778,980 | 12/1973 | Vancini | 55/456 X |
| 3,788,282 | 1/1974 | Modrak et al. | 55/348 X |
| 3,894,517 | 7/1975 | Meier | 55/348 X |
| 4,014,673 | 3/1977 | Kinnison | 55/396 |

FOREIGN PATENT DOCUMENTS

| 115052 | 12/1900 | Fed. Rep. of Germany . | |
|---|---|---|---|
| 931170 | 8/1955 | Fed. Rep. of Germany . | |
| 1033954 | 7/1953 | France | 55/456 |
| 1340881 | 9/1963 | France . | |
| 2275731 | 1/1976 | France . | |
| 1298879 | 12/1972 | United Kingdom | 55/456 |

Primary Examiner—Kathleen J. Prunner
Attorney, Agent, or Firm—Kerkam, Stowell, Kondracki & Clarke

[57] ABSTRACT

Apparatus for the separation of the liquid and vapor phases of a fluid incorporating an open ended cylinder in which are arranged blades. Each blade is in the form of a curvilinear triangular surface, whereof a first side contiguous with the cylindrical wall of the cylinder defines a helix whose axis coincides with the cylinder axis, an apex opposite to said first side is arranged substantially at the axis and the remaining sides define a leading edge substantially perpendicular to the cylinder axis and a trailing edge inclined with respect to said axis. A number of blades are joined together at their apices to define the blade arrangement within the cylinder.

The invention also relates to a steam generator having an outer casing, a first circuit in which circulates a hot primary fluid and a second circuit in which circulates a secondary fluid, whereby the latter incorporates at least one group of two separation apparatuses connected in series.

18 Claims, 4 Drawing Figures

APPARATUS FOR SEPARATING THE LIQUID AND VAPOR PHASES OF A FLUID

BACKGROUND OF THE INVENTION

The present invention relates to an apparatus for separating the liquid and vapour phases of a fluid and the application of such an apparatus to the reduction of the moisture content of steam leaving a steam generator.

Generally, a certain quantity of a fluid in the vapour phases is in the liquid phase. For numerous applications, the permitted percentage of a fluid in the liquid phase is well below the existing percentage and it is then necessary to pass the fluid through a suitable separating apparatus permitting the passage of the fluid in the vapour phase, whilst retaining most of the said fluid in the liquid phase transported by the vapour.

Thus, for example, steam generators in which a primary heat transfer fluid heats the water circulating in a secondary circuit to bring the latter to the vapour state generally produce saturated steam having a relatively high moisture content. This is more particularly the case when the primary fluid circulates in U tubes immersed in the water within the generator. In this type of steam generator, the moisture content of the steam produced varies between 20 and 80% by weight, as a function of the operation and utilization conditions. This moisture content is not compatible with the maximum moisture content permitted in the turbines generally driven by the steam leaving the steam generators. Thus, the steam driving the turbines must contain no more than 0.25% of liquid. It is therefore necessary to bring about an optimum complete separation of the liquid and vapour phases before the steam reaches the turbines. This separation is generally carried out within the steam turbines and specifically within the upper dome thereof.

Already, numerous separation apparatuses are known, which are positioned in the upper dome of steam generators. These known apparatuses generally operate according to the cyclone principle, by gravity or by means of labyrinth seals and retaining channels. However, they all have the disadvantage of either a relatively low efficiency level involving the arrangement in series of a large number of said separation apparatuses in the upper dome of the generator, or of having a high pressure drop which reduces the recirculation rate, or have overall dimensions such that they occupy a large area within the generator. In all three cases, the total overall dimensions of the separation apparatus or apparatuses within the steam generator are very great and leads to a significant increase in the total height of the generator compared with that occupied by the actual heat exchanger.

BRIEF SUMMARY OF THE INVENTION

The invention therefore relates to the construction of an apparatus for the separation of the liquid and vapour phases of a fluid having limited overall dimensions and pressure drops, but a high efficiency level, so that it can be used in a steam generator without disproportionately increasing the overall height thereof.

The invention also relates to the construction of a separation apparatus having a simple design and which can be used outside a steam generator.

The present invention therefore relates to an apparatus for the separation of the liquid and vapour phases of a fluid incorporating an open ended cylinder in which are arranged blades. Each blade is in the form of a curvilinear triangular surface, whereof a first side contiguous with the wall of the cylinder defines a helix whose axis coincides with the cylinder axis, an apex opposite to said first side is arranged substantially at the axis and the remaining sides define a leading edge substantially perpendicular to the cylinder axis and a trailing edge inclined with respect to said axis. A number of blades are joined together at their apices to define the blade arrangement within the cylinder.

As a result of this special configuration of the blades of the separation apparatus according to the invention, the apparatus has a high efficiency level for low overall dimensions. Thus, the use of two apparatuses of this type superimposed within the dome of a steam generator in most cases makes it possible to obtain a steam which can directly be used in turbines.

According to a preferred embodiment of the invention, the inclination angle of the trailing edge with respect to the cylinder axis is between 30° and 60°.

According to another feature of the invention, the trailing edge of each blade is curved and defines with the straight line joining the corresponding apices a surface curved inwards in the direction of the helix defined by the first side.

According to a first variant of the invention, the leading edge of each blade is rectilinear.

According to a second variant of the invention, each blade has on the side defining the leading edge a frustum-shaped extension curved inwards in the direction of the helix defined by the first side, the radius of curvature of said extension increasing towards the cylindrical wall.

Preferably, the fluid in the liquid phase, held back in the apparatus, is discharged by means of an annular cover positioned in the extension of the cylinder on the fluid discharge side and a cylindrical skirt whose diameter exceeds the diameter of the cylinder extending from the annular cover, the internal diameter of the latter being smaller than the cylinder diameter.

The invention is more particularly applicable to a steam generator of the type comprising an outer casing, a first circuit in which circulates a hot primary fluid and a second circuit in which circulates a secondary fluid, the latter entering the casing in the liquid state and leaving it in the vapour state after storing part of the calories transported by the primary fluid, the second circuit also incorporating means for separating the liquid and vapour phases of the secondary fluid positioned in the vicinity of the outlet from the casing, wherein the separation means comprise at least one group of two separation apparatuses connected in series.

Preferably, the cylinder of the second separation apparatus is then sealingly connected to the cover of the first separation apparatus.

In order to bring about a satisfactory operation of the generator, the second circuit comprises an upper chamber into which extends the second separation apparatus and a chamber into which issue the passages defined between the wall of each separation apparatus and the corresponding cylindrical skirt, the chambers being linked by drying means having a low pressure drop.

According to a preferred embodiment of the invention, each blade of the first separation apparatus on the side of the leading edge comprises a frustom-shaped extension curved inwards in the direction of the helix defined by the first side, the radius of curvature of this extension increasing towards the corresponding cylindrical wall and the leading edge of each blade of the second separation apparatus is rectilinear.

BRIEF DESCRIPTION OF THE DRAWINGS

The invention is shown in greater detail in the accompanying drawings which show preferred embodiments and in which.

DETAILED DESCRIPTION OF THE PREFERRED EMBODIMENTS

Figure 1:
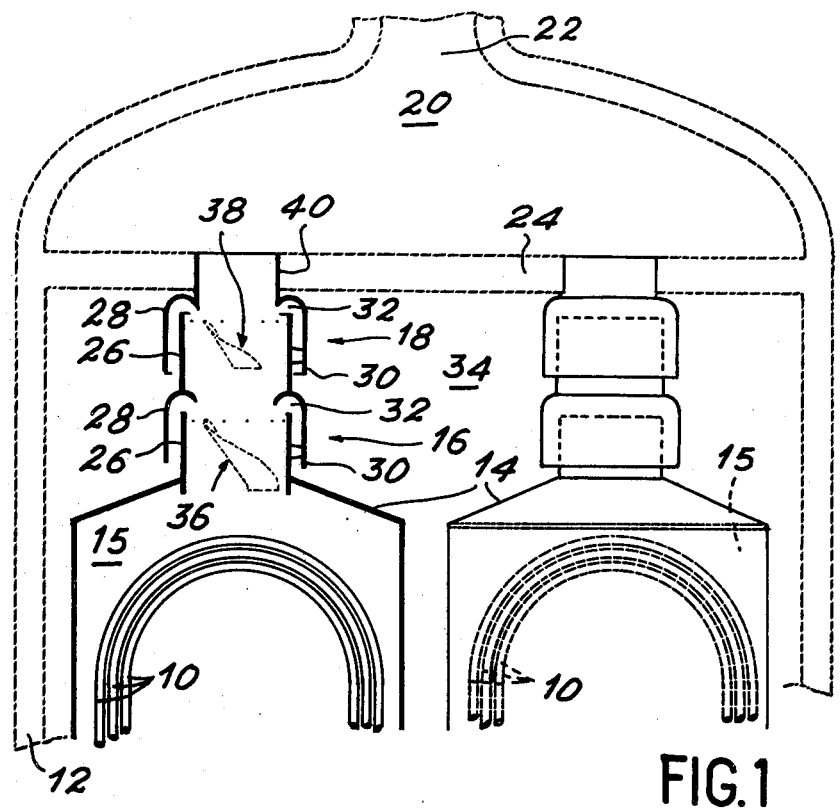
FIG. 1 is an axial sectional view diagrammatically representing the upper part of a steam generator incorporating such separation apparatuses constructed according to the invention.

The steam generator, whose upper part is shown in FIG. 1, is of a known construction in which the hot primary fluid circulates in a group of U tubes 10 for transmitting the calories which it carries to a secondary fluid, generally water. The generator comprises a cylindrical outer casing 12 having a vertical axis, a tightly sealed partition 14 surrounding the group of tubes 10 within the casing 12 and a group of two superimposed separation apparatuses 16 and 18 associated with the group of tubes 10 for interconnecting chamber 15 defined by the corresponding partition 14 with a chamber 20 formed in the upper part of casing 12. Chamber 20 is provided with an outlet 22 for linking to a not shown utilization circuit. As illustrated in FIG. 1, upper chamber 20 is separated from a chamber 34, in which are received the separation apparatuses 16 and 18, by means of a drying system 24.

As a result of this arrangement, when a hot primary fluid circulates in the group of tubes 10 and when a secondary fluid penetrates from the bottom into chamber 15, said secondary fluid vapourizes before entering chamber 20 by successively traversing the separation apparatuses 16 and 18, which make it possible to reduce the moisture content of the steam entering chamber 20 to a suitable value. The steam leaving chamber 20 via opening 22 is then advanced into the not shown utilization circuit generally incorporating the turbines which convert the thermal energy in the steam into mechanical energy.

According to the invention, each of the separators 16 and 18 has a tightly sealed, cylindrical wall 26 having a vertical axis, an annular cover 28 positioned in the extension of the cylindrical wall on the fluid outlet side, i.e. above said wall in the represented embodiment, and a cylindrical skirt 30 extending downwardly from the annular cover 28. The internal diameter of cover 28 is smaller than the diameter of wall 26 and the external diameter of cover 28, as well as the diameter of skirt 30, are larger than the diameter of wall 26. Thus, the cover and the cylindrical skirt define an annular passage 32 by which the fluid in the liquid phase is advanced into chamber 34 defined within casing 12 between the porous wall 24 and the tightly sealed partitions 14.

The separation of the liquid and vapour phases of the secondary fluid circulating through the separators 16 and 18 is brought about by means of blades 36, 38 which produce a centrifugal action within each apparatus. As illustrated in FIG. 1, the cylindrical wall 26 of each lower separation apparatus 16 is sealingly connected to the corresponding partition 14. In the same way, the cylindrical wall 26 of the upper separation apparatus 18 is sealingly connected to the cover 28 of the lower separation apparatus 16. Finally, the cover 28 of the upper separation apparatus 18 is sealingly connected to a pipe 40 which traverses the porous partition 24. Finally, and as illustrated in FIG. 1, the separation apparatus 16 and 18 are arranged coaxially and the dimensions of walls 26 and covers 28 are substantially the same.

The special shapes of blades 36 and 38, as well as their arrangement within the corresponding separation apparatuses 16 and 18 will now be described with reference to FIGS. 2 to 4.

Each of the separation apparatuses 16 and 18 contains six blades 36 and 38, regularly distributed within the hollow of the cylindrical wall 26.

Figure 2:
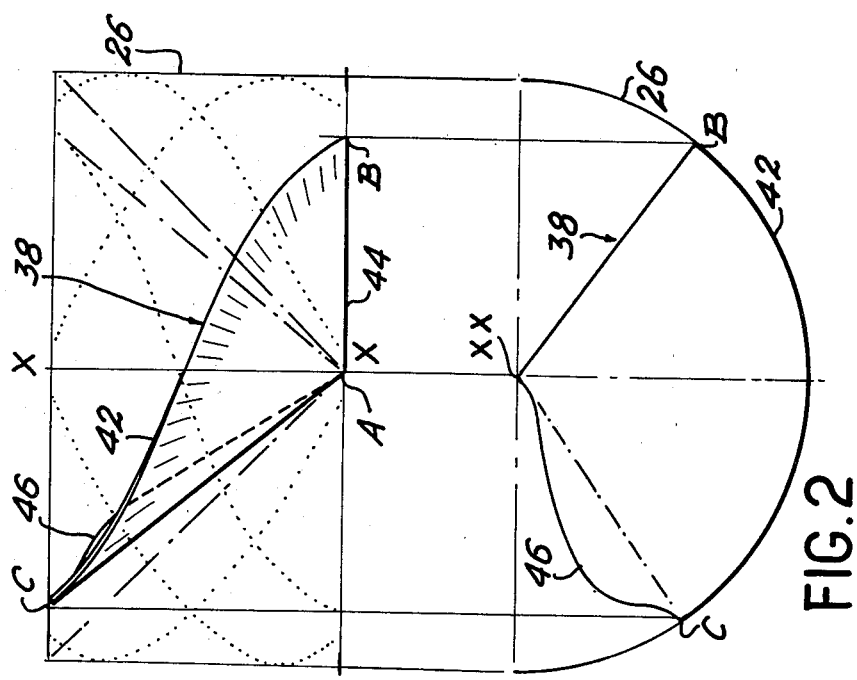
FIG. 2 is a side view showing the shape and the arrangement of the blades of the separation apparatus of each of the groups of separators of the steam generator of FIG. 1 and a plane projection in a direction perpendicular to the axis of the cylinder of one of the blades of said apparatus.

With the object of simplifying the description, we will start by describing with reference to FIG. 2 the blades 38 of the upper separation apparatus 18, whose shape is less complicated than that of the blades 36 of the lower separation apparatus 16.

Each of the blades 38 is in the form of a curvilinear triangular surface, whereof a first side 42 which is contiguous with the corresponding wall 26 defines a helix, whose axis coincides with the axis X—X of the wall. The apex A of this curvilinear triangle opposite to side 42 is positioned substantially along axis X—X. According to the invention, the six blades 38 are sealingly assembled to one another by their apex A, e.g. by welding, in such a way that there is no direct passage of secondary fluid through the corresponding separation apparatus 18. The two other sides AB and AC of the curvilinear triangle 38 respectively define a leading edge 44 substantially perpendicular to axis X—X of wall 26 and located at the lower end of the latter and a trailing edge 46 inclined with respect to axis X—X by an angle preferably between 30° and 60°. In the embodiment shown in FIG. 2, this angle has a value substantially equal to 45°. The leading edge 44 of each blade 38 is preferably rectilinear, whilst the trailing edge 46 is curved and defines, with the straight line AC joining the corresponding apices of the curvilinear triangle defined by the blade, a cylindrical surface curved inwards in the direction of the helix defined by side 42, i.e. upwards when considering the side view of FIG. 2. Preferably, each of the blades 38 is developable, i.e. the generatrices of the blades passing through apex A and side 42 are rectilinear. Moreover, the trailing edge 46 of each blade is preferably bevelled.

Figure 4:
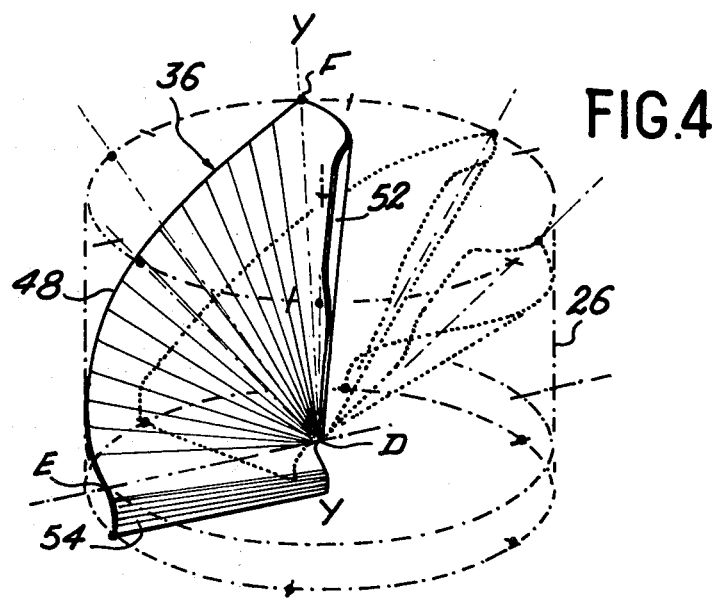
FIG. 4 is a perspective view showing the shape and distribution of the blades in the lower separation apparatus of FIG. 3.
Figure 3:
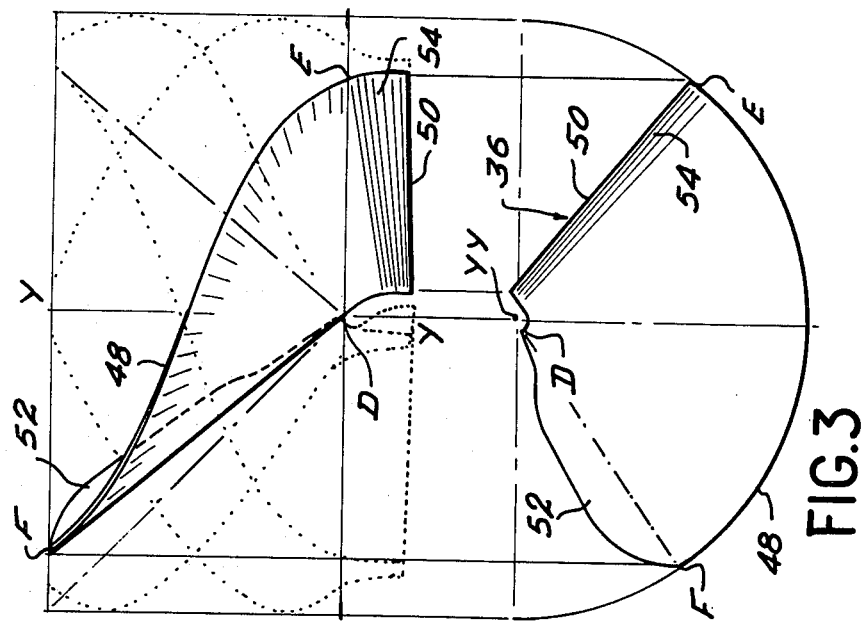
FIG. 3 is a view like that of FIG. 2 showing from the side the shape and arrangement of the blades of the lower separation apparatus of each group of separators shown in FIG. 1.

As shown in FIGS. 3 and 4, the blades 36 of the lower separation apparatus 16 are arranged in the same way as the blades 38 of separation apparatus 18, i.e. there are six of them, regularly distributed within the hollow of the cylindrical wall 26.

Moreover, the shape of the blades 36 is similar to the shape of blades 38. Each blade 36 is in the form of a curvilinear triangular surface, whereof one side 48 which is contiguous with wall 26 defines a helix, whose axis coincides with axis Y—Y of said wall. In the same way, apex D of the curvilinear triangle defined by each blade opposite to side 48 is essentially located in axis Y—Y. As in the case of the upper separation apparatus 18, the blades 36 are welded to one another level with apex D, as illustrated by FIG. 3. The two other sides DE and DF of the curvilinear triangle defined by each of the blades 36 constitute a leading edge 50 and a trailing edge 52. The trailing edge 52 is curved and bevelled in the same way as the trailing edge 46 of the edge of the blades 38. However, the blades 36 differ from blades 38 by their leading edge 50. Thus, each blade 36 has on the side of the leading edge 50 a frustum-shaped extension 54 whose axis is substantially perpendicular to axis Y—Y. This extension 54 is curved inwards in the direction of the helix formed by side 48, i.e. towards the bottom thereof in the case of FIG. 4 and the side view of FIG. 3. As shown in FIGS. 3 and 4, the radius of curvature of the frustum-shaped extension 54 increases from axis Y—Y towards the cylindrical wall 26. In the same way as for blades 38, each of the blades 36 is developable.

The operation of the steam generator described hereinbefore with reference to FIGS. 1 to 4 is as follows.

Due to the heat exchange between the primary fluid and the secondary fluid at the U tubes 10 in which circulates the primary fluid, the secondary fluid is vapourized in the chamber 15 defined within the tightly sealed cylindrical partition 14. The secondary fluid in the vapour phase has a relatively high moisture content between 20 and 80% by weight at the upper level of chamber 15. It then successively traverses the separation apparatuses 16 and 18 before entering the upper chamber 20 through pipes 40. The dried steam is then discharged by outlet 22 to the utilization circuits (not shown).

The steam which enters by the lower end of each of the separation apparatuses 16 and 18 is centrifuged by the helical blades 36 and 38, in such a way that the secondary fluid in the liquid phase is deposited on the inner face of the cylindrical wall 26 before being forwarded via passages 32 into chamber 34. The moisture content of the steam leaving the chambers 15 defined within the partitions 14 is therefore reduced by each of the separation apparatuses 16 and 18 in such a way that the moisture content of the steam contained in chamber 20 is below 0.25% by weight.

A small part of the steam can enter chamber 34 via passages 32. The fluid in the vapour phase entering chamber 34 is then recovered after traversing the drying system 24 which wholly or partly retains the liquid droplets without producing significant pressure drops in the outflowing steam. For example, system 24 can be constituted by a porous partition made from a commercially available product known under the trade name "KNIT". Drying can be carried out by gravity or by any other drying system (impact or labyrinth drier, etc).

It can be gathered from what has been stated hereinbefore that the separation apparatuses 16 and 18 according to the invention have a sufficiently high efficiency level to enable a group of two series-connected separators to reduce the moisture content of steam leaving the steam generator to an acceptable level. The overall dimensions of the steam generator are significantly reduced compared with those equipped with prior art separation apparatuses.

Obviously, the invention is not limited to the embodiment described hereinbefore in exemplified manner and in fact covers all variants thereof.

Thus, the apparatuses for separating the liquid and vapour phases according to the invention can be used whenever such a separation is required and they are not limited to use in a steam generator in the manner described hereinbefore.

What is claimed is:

1. An apparatus for the separation of the liquid and vapor phases of a fluid incorporating an open ended cylinder having an axis and blades in the cylinder, wherein each blade is in the form of a curvilinear triangular surface having a first side contiguous with the cylinder and defining a helix whose axis coincides with the cylinder axis, an apex opposite to said first side, arranged substantially at the axis of the cylinder and assembled in sealed manner at the corresponding apices of the other blades, two other sides of the triangular surface defining a leading edge substantially perpendicular to the cylinder axis and a trailing edge inclined with respect to said axis, and two other apices opposite respectively to said leading edge and to said trailing edge, said trailing edge being curved and defining with a straight line joining the apices opposite to said first side and to said leading edge a surface curved inwards in a direction of the helix defined by the first side.

2. Apparatus according to claim 1, wherein the inclination angle of the trailing edge with respect to the axis of the cylinder is between 30° and 60°.

3. Apparatus according to claim 1, wherein the leading edge of each blade is rectilinear.

4. Apparatus according to claim 1, including an annular cover located on a fluid outlet side of said cylinder and a cylindrical skirt whose diameter is larger than that of the cylinder and extending from the annular cover, the internal diameter of the annular cover being smaller than the diameter of the cylinder.

5. Apparatus according to claim 1, wherein the axis of the cylinder is vertical and the fluid enters from the bottom of the cylinder.

6. An apparatus for the separation of the liquid and vapor phases of a fluid incorporating an open ended cylinder having an axis and blades in the cylinder, wherein each blade is in the form of a curvilinear triangular surface having a first side contiguous with the cylinder and defining a helix whose axis coincides with the axis of the cylinder, an apex opposite to said first side, arranged substantially at the axis of the cylinder and joined and sealed at the corresponding apieces of the other blades, two other sides of the triangular surface defining a leading edge substantially perpendicular to the axis of the cylinder and a trailing edge inclined with respect to said axis, and two other apices opposite respectively to said leading edge and to said trailing edge, each blade having on the leading edge a frustum-shaped extension curved inwards in a direction of the helix defined by the first side, the radius of curvature of said extension increasing towards the cylinder.

7. Apparatus according to claim 6, wherein the inclination angle of the trailing edge with respect to the axis of the cylinder is between 30° and 60°.

8. Apparatus according to claim 6, wherein the leading edge of each blade is rectilinear.

9. Apparatus according to claim 6, including an annular cover located on a fluid outlet side of said cylinder and a cylindrical skirt whose diameter is greater than the diameter of the cylinder and extending from the annular cover, the internal diameter of the cover being smaller than the diameter of the cylinder.

10. Apparatus according to claim 6, wherein the axis of the cylinder is vertical and the fluid enters from the bottom of the cylinder.

11. A steam generator of the type comprising an outer casing, a first circuit in which circulates a hot primary fluid and a second circuit in which circulates a secondary fluid, the secondary fluid entering the casing in the liquid state and leaving it in the vapor state after storing part of the calories transported by the primary fluid, the second circuit also incorporating means for separating the liquid and vapor phases of the secondary fluid positioned in the vicinity of an outlet from the casing, wherein the separation means comprise at least one group of two separation apparatuses connected in series, each of said apparatuses incorporating an open ended cylinder having an axis and blades within the cylinder, each blade being in the form of a curvilinear triangular surface having a first side contiguous with the cylinder and defining a helix having an axis which coincides with the axis of the cylinder, an apex opposite to said first side, arranged substantially at the axis of the cylinder and joined and sealed at the corresponding apices of the other blades, two other sides of the triangular surface defining a leading edge substantially perpendicular to the axis of the cylinder and a trailing edge inclined with respect to said axis, and two other apices opposite respectively to said leading edge and to said trailing edge, said trailing edge being curved and defining with a straight line joining the apices opposite to said first side and to said leading edge a surface curved inwards in a direction of the helix defined by the first side.

12. A generator according to claim 11, wherein each of said apparatuses includes an annular cover on a fluid outlet side of said cylinder, a cylindrical skirt having a diameter greater than that of the cylinder and extending from the annular cover, the internal diameter of the annular cover being smaller than the diameter of the cylinder, the axis of the cylinder being vertical and the fluid entering from the bottom of the cylinder, the cylinder of a second of said separation apparatuses being connected and sealed to the cover of a first of said apparatuses.

13. A generator according to claim 12, wherein the second circuit comprises an upper chamber into which opens the second of said separation apparatuses and a chamber into which open passages defined between the cylinder of each of said separation apparatuses and the corresponding cylindrical skirt, and drying means having a low pressure drop connecting the chambers.

14. A generator according to claim 13, wherein each blade of the first of said separation apparatuses on the side of the leading edge comprises a frustum-shaped extension curved inwards in a direction of the helix defined by the first side, the radius of curvature of said extension increasing towards the corresponding cylinder and wherein the leading edge of each blade of the second of said separation apparatuses is rectilinear.

15. A steam generator of the type comprising an outer casing, a first circuit in which circulates a hot primary fluid and a second circuit in which circulates a secondary fluid, the secondary fluid entering the casing in the liquid state and leaving it in the vapor state after storing part of the calories transported by the primary fluid, the second circuit also incorporating means for separating the liquid and vapor phases of the secondary fluid positioned in the vicinity of an outlet from the casing, wherein the separation means comprise at least one group of two separation apparatuses connected in series, each said separation apparatus comprising an open ended cylinder having an axis and blades in said cylinder, each blade having a curvilinear triangular surface having a first side contiguous with the cylinder and defining a helix whose axis coincides with the axis of the cylinder, an apex opposite to said first side, arranged substantially at the axis of the cylinder and joined and sealed at the corresponding apices of the other blades, two other sides of the triangular surface defining a leading edge substantially perpendicular to the axis of the cylinder and a trailing edge inclined with respect to said axis, and two other apices opposite respectively to said leading edge and to said trailing edge, each blade of the first of said separation apparatuses in the series having on the leading edge a frustum-shaped extension curved inwards in a direction of the helix defined by the first side, the radius of curvature of said extension increasing towards the cylinder.

16. A generator according to claim 15, wherein each of said separation apparatuses has an annular cover located on a fluid outlet side of said cylinder and a cylindrical skirt having a greater diameter than that of the cylinder and extending from the annular cover, the internal diameter of the annular cover being smaller than the diameter of the cylinder, the axis of the cylinder being vertical and the fluid entering from the bottom of the cylinder, the cylinder of a second of said separation apparatuses being connected and sealed to the cover of a first of said apparatuses.

17. A generator according to claim 16, wherein the second circuit comprises an upper chamber into which opens the second of said separation apparatuses and a chamber into which open passages defined between the cylinder of each of said separation apparatuses and the corresponding cylindrical skirt, and drying means having a low pressure drop connecting the chambers.

18. A generator according to claim 15, wherein the leading edge of each blade of the second of said separation apparatuses in the series is rectilinear.

* * * * *